US009661542B2

(12) United States Patent
Sawhney et al.

(10) Patent No.: US 9,661,542 B2
(45) Date of Patent: May 23, 2017

(54) OPTIMIZED LTE MIB/SIB COLLECTION LOGIC AFTER LTE HANDOVER

(71) Applicant: QUALCOMM Incorporated, San Diego, CA (US)

(72) Inventors: Salil Sawhney, San Diego, CA (US); Abhijeet Prasad, San Diego, CA (US); Muralidharan Murugan, San Diego, CA (US); Daniel Amerga, San Diego, CA (US); Kanagaraj Porur Damodaran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 21 days.

(21) Appl. No.: 14/656,444

(22) Filed: Mar. 12, 2015

(65) Prior Publication Data

US 2016/0269956 A1  Sep. 15, 2016

(51) Int. Cl.

| H04W 36/14 | (2009.01) |
|---|---|
| H04W 36/08 | (2009.01) |
| H04W 48/10 | (2009.01) |
| H04W 76/02 | (2009.01) |
| H04W 36/30 | (2009.01) |
| H04W 88/02 | (2009.01) |

(52) U.S. Cl.
CPC ........... *H04W 36/14* (2013.01); *H04W 36/08* (2013.01); *H04W 36/30* (2013.01); *H04W 48/10* (2013.01); *H04W 76/027* (2013.01); *H04W 88/02* (2013.01)

(58) Field of Classification Search
CPC ..... H04W 36/14; H04W 36/30; H04W 48/10; H04W 76/027; H04W 36/08; H04W 88/02
See application file for complete search history.

(56) References Cited

U.S. PATENT DOCUMENTS

| 2004/0242199 | A1* | 12/2004 | Edlund | H04W 8/245 455/411 |
|---|---|---|---|---|
| 2008/0253332 | A1* | 10/2008 | Ore | H04J 11/0069 370/331 |
| 2009/0253422 | A1 | 10/2009 | Fischer | |
| 2010/0304748 | A1 | 12/2010 | Henttonen et al. | |
| 2010/0322118 | A1 | 12/2010 | Fang et al. | |
| 2011/0081898 | A1* | 4/2011 | Park | H04L 5/0007 455/418 |
| 2011/0105158 | A1* | 5/2011 | Arora | H04W 48/14 455/466 |

(Continued)

OTHER PUBLICATIONS

International Search Report and Written Opinion—PCT/US2016/018426—ISA/EPO—Jun. 21, 2016.

(Continued)

*Primary Examiner* — Nathan Mitchell
(74) *Attorney, Agent, or Firm* — Arent Fox LLP

(57) ABSTRACT

A method, an apparatus, and a computer program product for wireless communication are provided. The apparatus performs a handover from a source cell to a target cell. The apparatus determines a decoding timer value based on network conditions. The apparatus attempts to decode a MIB or a SIB from the target cell within a time after the handover corresponding to the decoding timer value. The apparatus triggers a radio link failure (RLF) when the MIB or the SIB is not decoded within the time corresponding to the decoding timer value.

8 Claims, 13 Drawing Sheets

(56) References Cited

U.S. PATENT DOCUMENTS

| | | | |
|---|---|---|---|
| 2011/0269466 A1* | 11/2011 | McGilly | H04W 36/0072 |
| | | | 455/436 |
| 2012/0147830 A1* | 6/2012 | Lohr | H04W 72/042 |
| | | | 370/329 |
| 2012/0202481 A1* | 8/2012 | Martin | H04W 36/0061 |
| | | | 455/423 |
| 2013/0176862 A1 | 7/2013 | Gwak et al. | |
| 2013/0188473 A1 | 7/2013 | Dinan | |
| 2014/0112180 A1 | 4/2014 | Axmon et al. | |
| 2014/0204866 A1 | 7/2014 | Siomina et al. | |
| 2014/0287759 A1* | 9/2014 | Purohit | H04W 56/0015 |
| | | | 455/437 |

OTHER PUBLICATIONS

Huwai Technologies Co., Ltd: "Reading MIB/SIB for inbound mobility to CSG," TDoc G2-090153, Agenda Item: 5.3.3, 3GPP TSG GERAN WG2 #43 bis, Oct. 21-23, 2009, 4 pages.
Partial International Search Report—PCT/US2016/018426—ISA/EPO—Apr. 13, 2016.

* cited by examiner

OPTIMIZED LTE MIB/SIB COLLECTION LOGIC AFTER LTE HANDOVER

BACKGROUND

Field

The present disclosure relates generally to communication systems, and more particularly, to a method of MIB/SIB decoding by a user equipment after a Long Term Evolution handover procedure.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In voice over LTE (VoLTE) networks, Transmission Time Interval-Bundling (TTI-B) is enabled in poor coverage conditions to improve a UE's uplink performance. Enabling TTI-B using current software restrictions of evolved Node B (eNB) networks involves triggering a radio resource control (RRC) Reconfiguration message with mobility control information to enable the UE to perform a handover within a same cell (e.g., a handover from a cell to the same cell).

SUMMARY

In an aspect of the disclosure, a method, a computer program product, and an apparatus are provided. The apparatus performs a handover from a source cell on a cell frequency to a target cell on the same frequency. The apparatus determines that the target cell is the same as the source cell. The apparatus uses information from a master information block (MIB) message or a system information block (SIB) message previously received from the source cell.

In another aspect of the disclosure, a method, a computer program product, and an apparatus are provided. The apparatus performs a handover from a source cell to a target cell. The apparatus determines a decoding timer value based on network conditions. The apparatus attempts to decode a MIB or a SIB from the target cell within a time after the handover corresponding to the decoding timer value. The apparatus triggers a radio link failure (RLF) when the MIB or the SIB is not decoded within the time corresponding to the decoding timer value.

In another aspect of the disclosure, a method, a computer program product, and an apparatus are provided. The apparatus includes a memory, and at least one processor coupled to the memory. The processor of the apparatus is configured to perform a handover from a source cell to a target cell. The processor of the apparatus is configured to determine a decoding timer value based on network conditions. The processor of the apparatus is configured to attempt to decode a MIB or a SIB from the target cell within a time after the handover corresponding to the decoding timer value. The processor of the apparatus is configured to trigger a RLF when the MIB or the SIB is not decoded within the time corresponding to the decoding timer value.

In another aspect of the disclosure, a method, a computer program product, and an apparatus are provided. The apparatus includes a memory, and at least one processor coupled to the memory. The processor of the apparatus is configured to perform a handover from a source cell on a cell frequency to a target cell on the same frequency. The processor of the apparatus is configured to determine that the target cell is the same as the source cell. The processor of the apparatus is configured to use information from a master information block (MIB) message or a system information block (SIB) message previously received from the source cell.

In another aspect of the disclosure, a method, a computer program product, and an apparatus are provided. The computer program product includes computer-readable medium storing computer executable code, including code. The code is for performing a handover from a source cell to a target cell. The code is for determining a decoding timer value based on network conditions. The code is for attempting to decode a master information block (MIB) or a system information block (SIB) from the target cell within a time after the handover corresponding to the decoding timer value. The code is for triggering a radio link failure (RLF) when the MIB or the SIB is not decoded within the time corresponding to the decoding timer value In another aspect of the disclosure, a method, a computer program product, and an apparatus are provided. The computer program product includes computer-readable medium storing computer executable code, including code. The code is for performing a handover from a source cell on a cell frequency to a target cell on the same frequency. The code is for determining that the target cell is the same as the source cell. The code is for using information from a master information block (MIB) message or a system information block (SIB) message previously received from the source cell.

DETAILED DESCRIPTION

Figure 1:
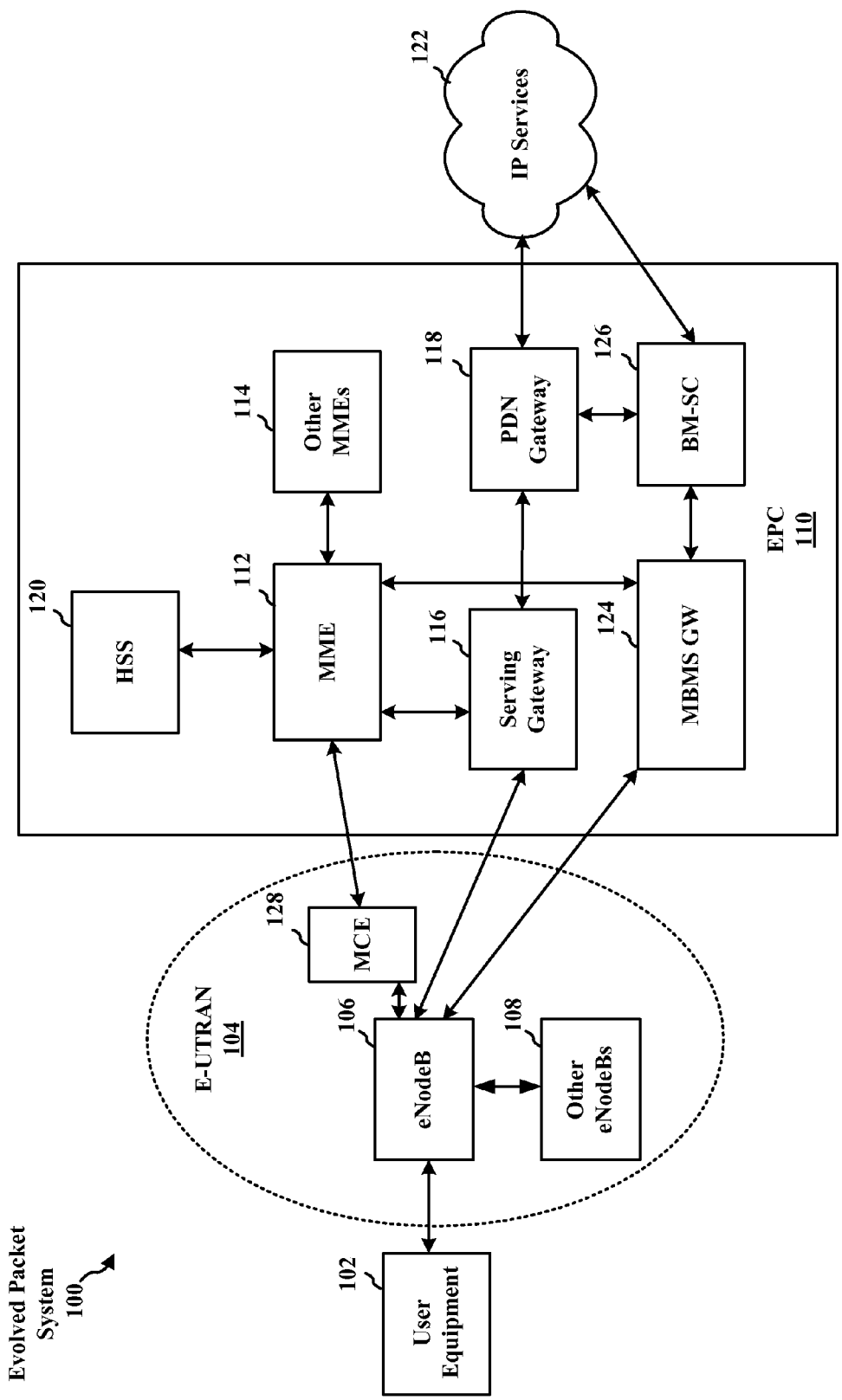
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
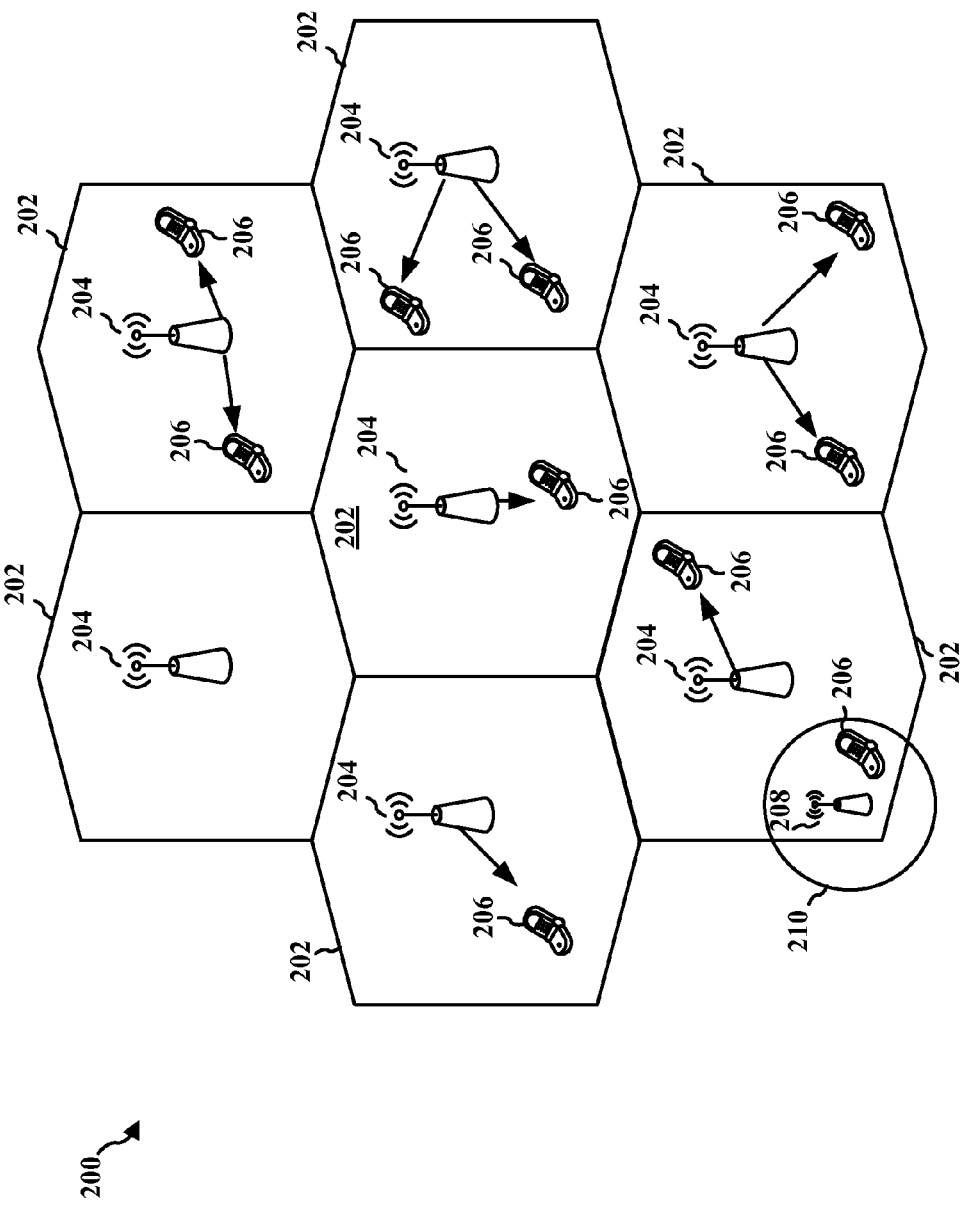
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
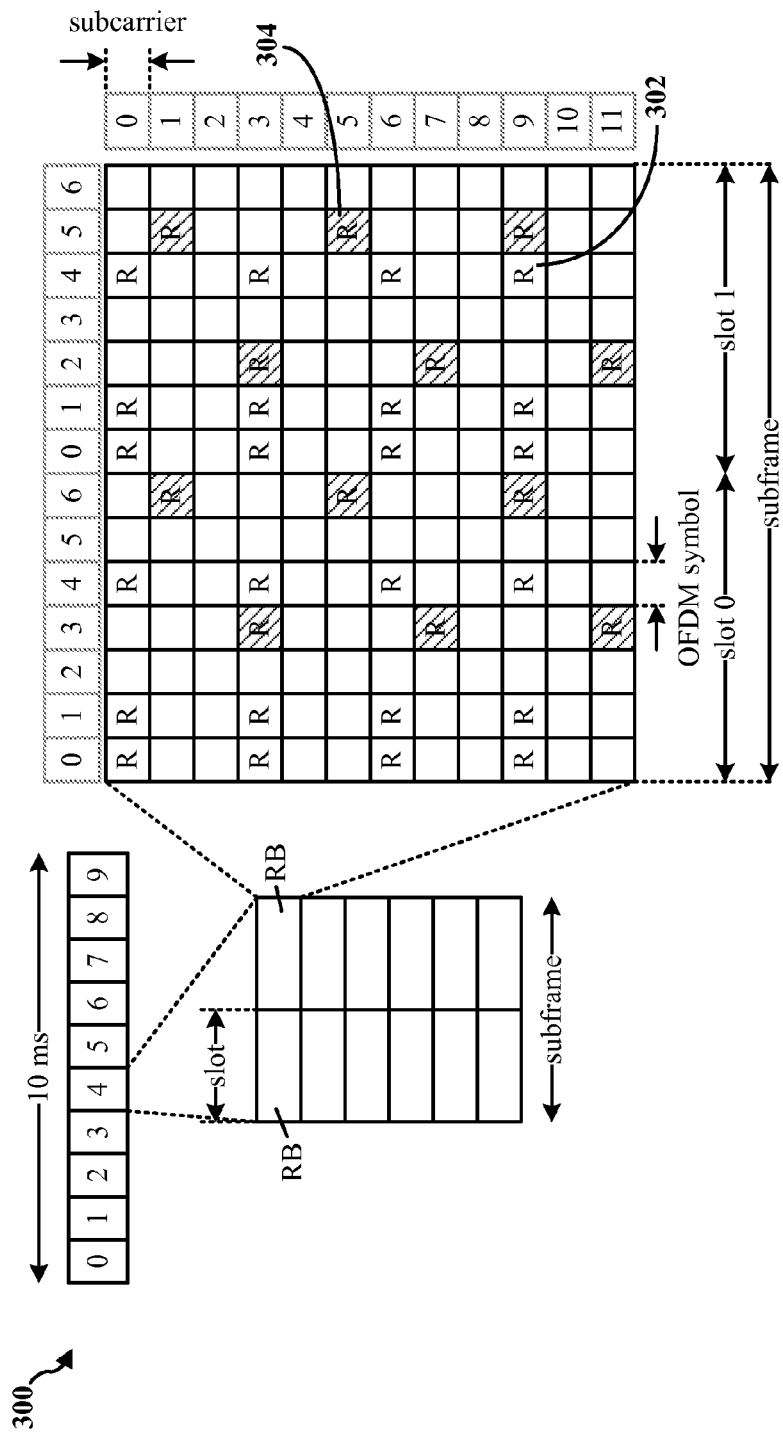
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
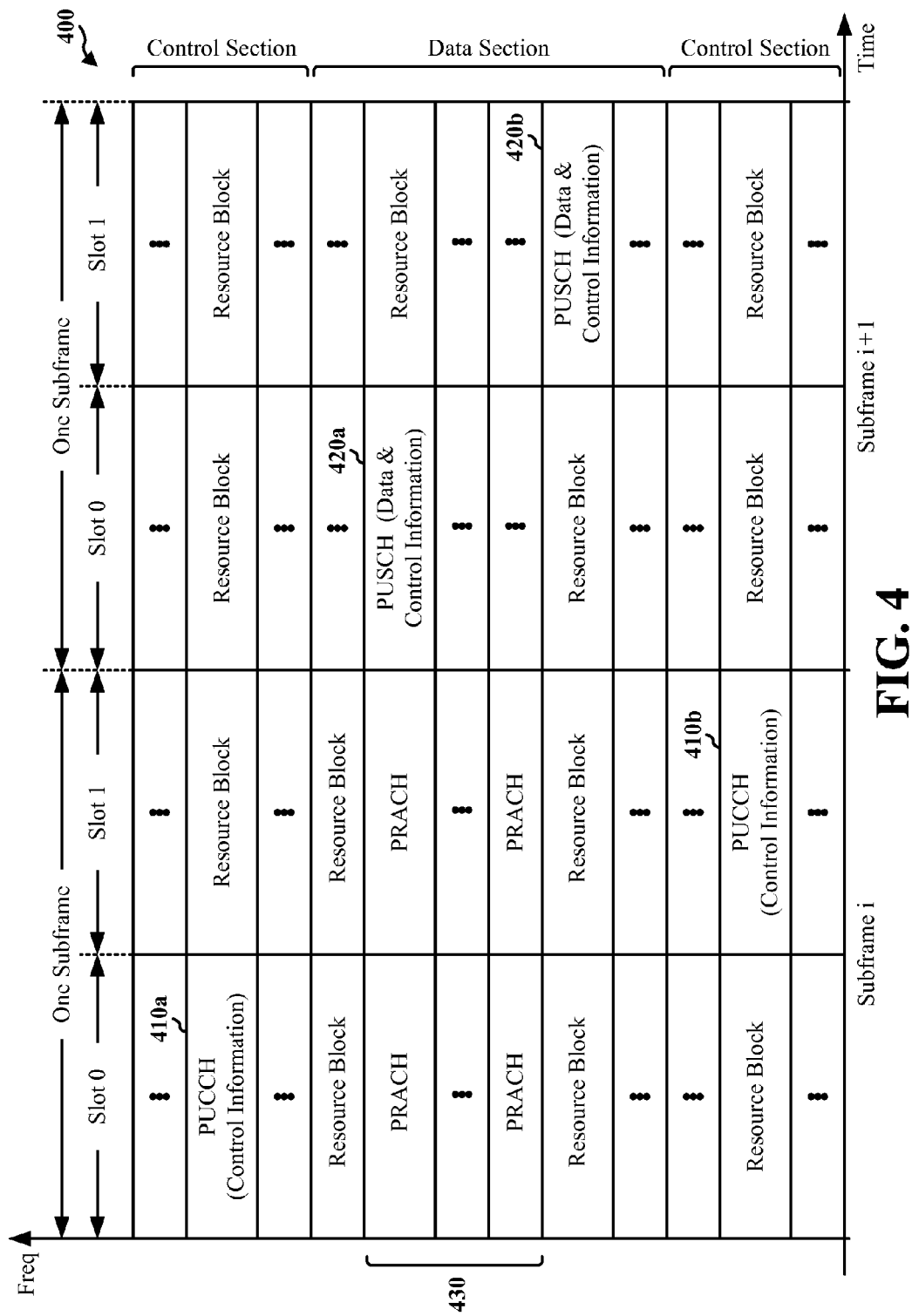
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
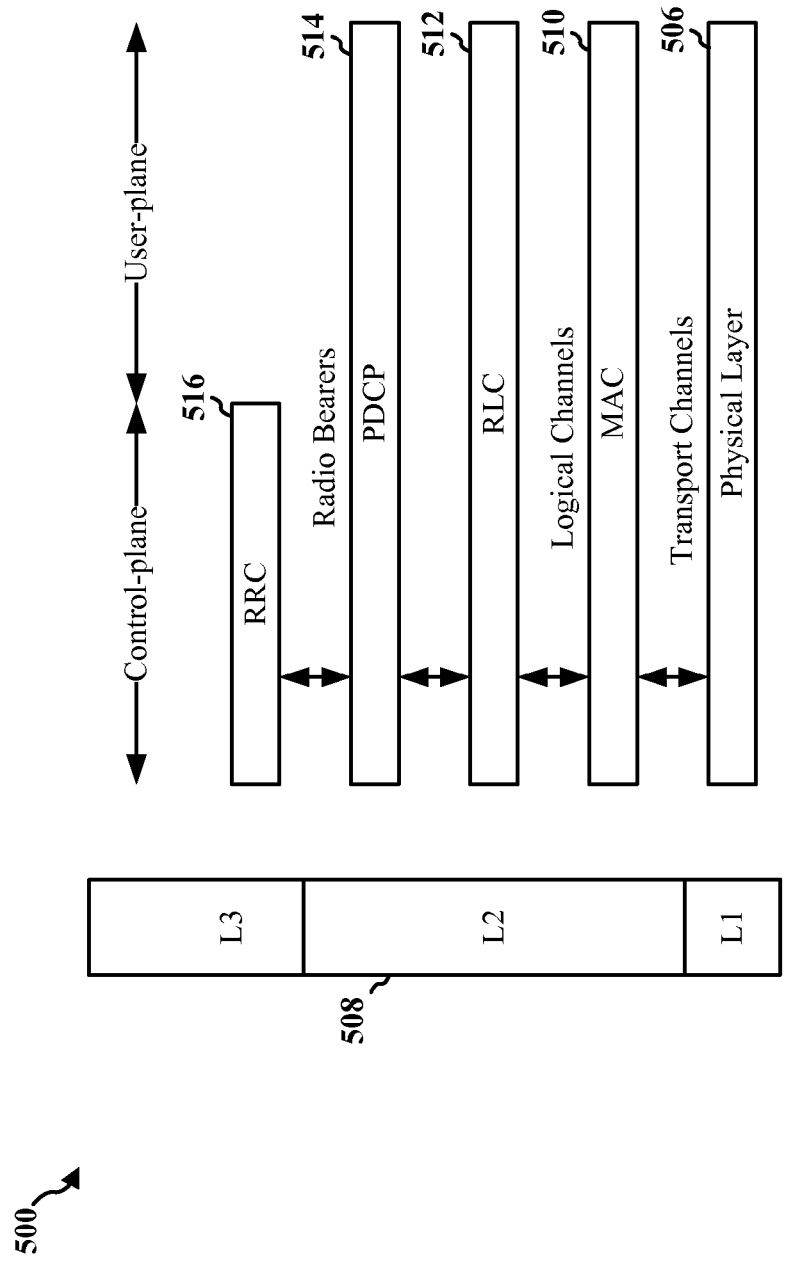
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
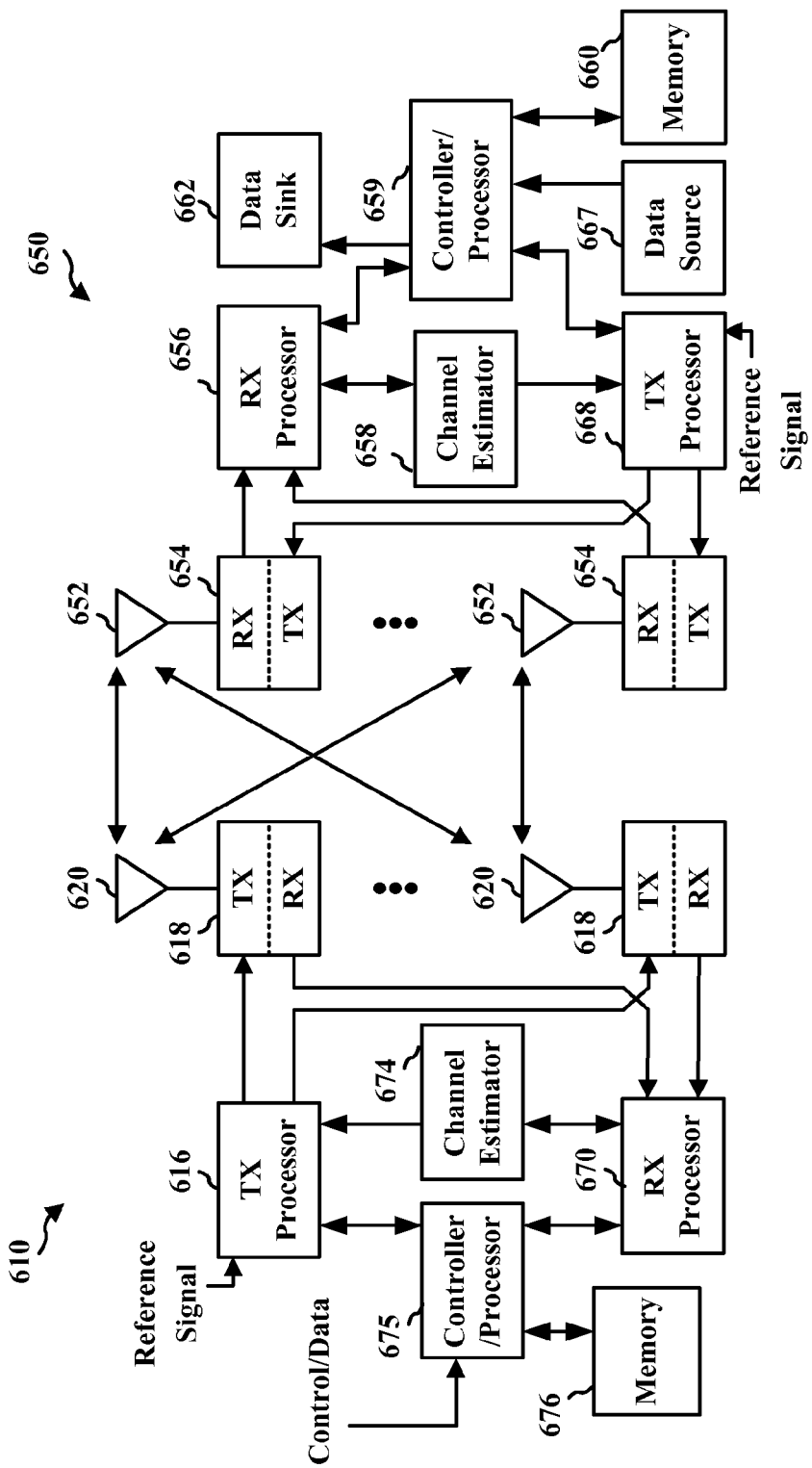
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
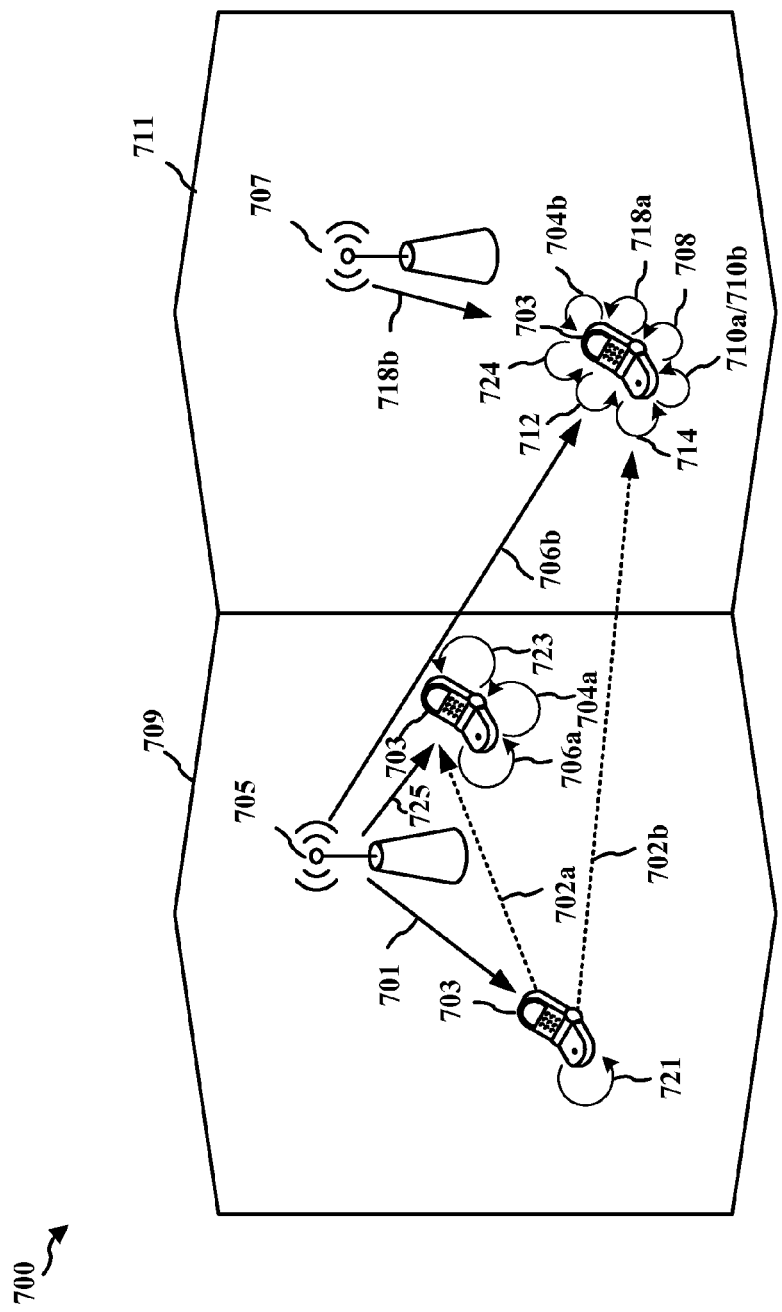
FIG. 7 is a diagram of illustrating examples of scenarios of a handover of a user equipment according to different configurations.

FIG. 7 is a diagram 700 of illustrating examples of scenarios of a handover 702a, 702b of a user equipment (UE) 703 according to different configurations.

Generally, after an LTE handover of a UE from a source cell to a target cell, the UE attempts to decode a MIB and/or a SIB on the target cell by reading a MIB or SIB message received from the base station of the target cell. Current procedures of enabling a UE to perform a handover within a same cell (e.g., wherein the source cell and the target cell are the same) involve the UE reading, or attempting to decode, an LTE MIB or an LTE SIB received from the same cell after the handover procedure within the same cell has occurred. However, when the UE is handed over within a same cell, the UE may already have MIB information and/or SIB information corresponding to the (same) target cell. Furthermore, if the UE is unable to successfully decode the MIB/SIB after the handover procedure (e.g., due to poor RF coverage, or due to a heavy DL interference situation) the UE may experience a VoLTE call failure caused by the UE triggering a radio link failure.

Various configurations described with reference to FIG. 7, however, enable a UE 703 to intelligently determine how much time to allow to elapse during the UE's attempt to decode the MIB/SIB after performing a same cell handover 702a (e.g., after completing a same cell handover with a TTI-B flag toggled), or after performing a handover 702b from a source cell 709 to a different target cell 711. That is, by enabling the UE 703 to intelligently decode the MIB/SIB on the target cell, according to the configurations described with respect to FIG. 7, the UE 703 may avoid unnecessary Radio Link Failure (RLF) declarations and the corresponding VoLTE call failures that are caused by the failure of the UE 703 to decode the MIB/SIB of the target cell within a maximum amount of time allowed by a decoding timer (e.g., within an amount of time corresponding to a decoding timer value).

In a first configuration, the UE 703 performs a handover 702a within a same cell 709. That is, in the present configuration, the source cell 709 and the target cell 709 are the same. When the UE 703 is handed over 702a within a same cell 709, upon determining 704a that the target cell 709 is the same as the source cell 709 (e.g., upon the UE 703 determining 723 that the source cell 709 and the target cell 709 have the same cell identifier (e.g., a Cell ID, an Enhanced Cell ID (E-Cell ID), a Physical Cell ID, etc.), the UE 703 may completely skip any attempt to read, or to decode, MIB/SIB information available from the target cell 709. That is, the UE 703 may refrain from attempting to decode a MIB or SIB available 725 from the target cell 709. For example, the UE 703 may determine 704a that the source cell 709 and the target cell 709 are the same by determining that the cell frequency of the source cell 709 is the same as the cell frequency of the target cell 709.

Accordingly, the UE 703 may skip reading the MIB/SIB that is available 725 after the handover 702a, as the UE 703 may already be aware of any information propagated in a prior MIB message(s) and/or SIB message(s) previously received 701 from the source cell 709 due to the UE's prior affiliation with the source cell 709, and due to the source cell 709 and the target cell 709 being the same, thus making the information corresponding to the MIB/SIB still applicable to the target cell 709. Because the UE 703 is able to use the information previously received 701 in a MIB/SIB message from the source cell 709, the UE 703 will not unnecessarily declare, or trigger 724, an RLF failure due to its inability to decode the MIB/SIB, and therefore will not experience an unnecessary VoLTE call failure.

In other configurations described infra, the UE 703 performs a handover 702b from a source cell 709 either to the same cell 709 as a target cell, or, unlike the handover 702a described above with respect the first configuration, to a target cell 711 that is different from the source cell 709. For ease of description, the following configurations will be described with respect to distinct source and target cells, although the following configurations are also applicable to indistinct source and target cells (e.g., a same cell handover 702a).

According to the present configurations, upon performing the handover 702b from the source cell 709 to the target cell 711, the UE 703 may determine 712 a decoding timer value based on one or more network conditions (the various network conditions corresponding to respective ones of the present configurations, as will be described below). Once the UE 703 has determined 712 the decoding timer value, the UE 703 may attempt to decode 718a a MIB or a SIB from the target cell 711 within a time after the handover 702b, where the time corresponds to the determined 712 decoding timer value. If the UE 703 is unable to decode 718a the MIB/SIB within the time corresponding to the decoding timer value, the UE 703 may trigger 724 an RLF, thereby giving up on the target cell 711. It should be noted that other timers used by the UE 703, or timers used by the system(s) of the source cell 709 or the target cell 711 and received by the UE 703, may also be used by the UE 703 to trigger 724 an RLF. That is, the UE 703 may be able to select a MIB/SIB decoding timer from potentially any timer value that is sent to the UE 703 in the handover signaling message by the eNB of the source cell 709 or sent to the UE 703 in a SIB message.

According to a first of the alternative configurations, the UE 703 may determine 712 the decoding timer value based on a determination 704b of RF conditions of the target cell 711. That is, the UE 703 may allow for a static decoding timer value that corresponds to a time within which the UE 703 should be able to decode 718a the MIB/SIB following the handover from the source cell 709 to the target cell 711. For example, if the UE 703 determines 704b that the RF conditions of the target cell 711 are exceptionally poor (e.g., if the UE 703 determines that a large amount of signal interference, or noise, is present at the target cell 711), then the UE 703 may determine 712 an increased decoding timer value to allow for a greater amount of time for the UE 703 to decode the MIB/SIB before triggering 724 a RLF. Similarly, if the UE 703 determines that the RF conditions of the target cell 711 are favorable, the UE may determine 712 a relatively smaller decoding timer value.

According to a second of the alternative configurations, the UE 703 may receive 706b information indicating the decoding timer value directly from an eNB 705 of the source cell 709. That is, the UE 703 could dynamically determine 712 the decoding timer value based on an over-the-air (OTA) RRC configured timer value. The OTA RRC configured timer value may be based on SIB periodicity (e.g., the frequency at which SIBs are transmitted) of the source cell 709 (or a multiple thereof), or based on an RLF declaration timer received from the eNB 705 (or a multiple thereof).

Furthermore, in the present configuration, should the UE 703 fail to decode 718a the MIB/SIB within the amount of time following the handover 702b corresponding to the static decoding timer value (e.g., if the UE 703 is attempting to decode 718a the MIB/SIB in an RF challenged environment), the UE may increase 714 the decoding timer value, such that the UE 703 may thereafter allow for a greater amount of time following the handover 702b to decode the MIB/SIB before triggering 724 an RLF.

According to a third of the alternative configurations, the UE 703 may dynamically determine 712 the decoding timer value by measuring 708 a type of downlink radio network temporary identifier based physical downlink shared channel block error rate (DL RNTI based PDSCH BLER) to determine whether the DL RNTI based PDSCH BLER meets a given threshold.

Similarly, according to a variation of the present configuration, following a successful handover 702b to the target cell 711, the UE 703 may attempt to continuously track a downlink cell-radio network temporary identifier (DL C-RNTI) based PDSCH BLER of the target cell while attempting to decode system information-radio network temporary identifier (SI-RNTI) based SIBs on the PDSCH. If the measured 708 DL C-RNTI based PDSCH BLER is low (e.g., below a first threshold) while the measured 708 SI-RNTI based PDSCH BLER is high (e.g., above a second threshold), the UE 703 may dynamically increase 714 the SIB decoding timer value. As an example, the number of instances the UE 703 increases 714 the decoding timer value could be limited to a preconfigured maximum number, after which the UE 703 could avoid reading, or attempting to decode 718a, the MIB/SIB on the target cell 711, or after which the UE could declare a timeout to trigger 724 a RLF on the target cell 711.

According to a fourth of the alternative configurations, the UE 703 may measure 710a, 710b downlink signal strength of the target cell 711 and/or downlink signal quality of the target cell 711, and the UE 703 may determine 712 the decoding timer value based on whether the measured 710a, 710b downlink signal strength and/or the measured downlink signal quality is above a corresponding threshold during an evaluation period. For example, following completion the handover 702b to the target cell 711, the UE 703 may begin to monitor a reference signal received power (RSRP) of the target cell 711, a reference signal received quality (RSRQ) of the target cell 711, a signal-to-interference-noise ratio (SINR) of the target cell 711, a channel quality indicator (CQI) of the target cell 711, a precoding matrix indicator (PMI) of the target cell 711, and/or a rank indicator (RI) of the target cell 711. If one of the above measured metrics, or alternatively, if some preconfigured combination of two or more of the above metrics, is measured 710a to be above the corresponding threshold for a duration of the evaluation period, then the UE 703 may choose to extend, or increase 714, the MIB/SIB decoding timer value to a larger value. As an example, and as mentioned with respect to the third of the alternative configurations above, the number of times the UE 703 increases 714 the decoding timer value could be limited to a preconfigured number of times, after which the UE 703 may stop reading the MIB/SIB, or may trigger 724 a RLF.

Figure 8:
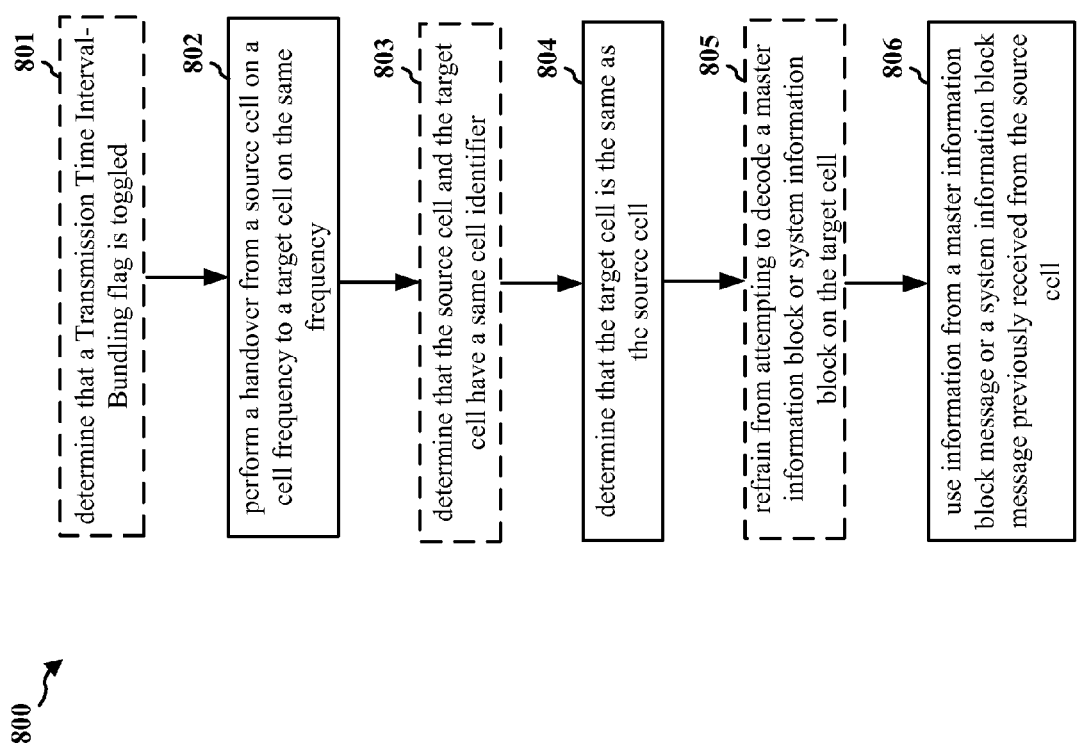
FIG. 8 is a flow chart of a method of wireless communication.

FIG. 8 is a flow chart 800 of a method of wireless communication. The method may be performed by a UE (e.g., the UE 703 experiencing a same cell handover 702a as described with respect to the first configuration, described supra, or the UE 703 shown in FIG. 7, the apparatus 902/902' shown in FIGS. 9 and 10, discussed infra). At 801, the UE may determine that a TTI-B flag is toggled. For example, referring to FIG. 7, the UE 703 may determine 721 that a TTI-B flag is toggled. At 802, the UE performs a handover from a source cell on a cell frequency to a target cell on the same frequency. For example, referring to FIG. 7, the UE 703 may perform a handover 702a from a source cell 709 on a cell frequency to a target cell 709 on the same frequency (e.g., the UE 703 may allow or enable a handover, or may allow itself to be handed over, from a source cell 709 to a target cell 709). At 803, the UE may determine that the source cell and the target cell have a same cell identifier. For example, referring to FIG. 7, the UE 703 may determine 723 that the source cell 709 and the target cell 709 have a same cell identifier. At 804, the UE determines that the target cell is the same as the source cell. For example, referring to FIG. 7, the UE 703 may determine 704a that the target cell 709 is the same as the source cell 709. At 805, the UE may refrain from attempting to decode a MIB or a SIB on the target cell. For example, referring to FIG. 7, the UE 703 may refrain from attempting to decode a MIB or a SIB available 725 on the target cell 709. Finally, at 806, the UE uses information from a MIB message or a SIB message previously received from the source cell. For example, referring to FIG. 7, the UE 703 may use 706a information from a MIB message or a SIB message previously received 701 from the source cell 709 (e.g., an eNB 705 of the source cell 709).

Figure 9:
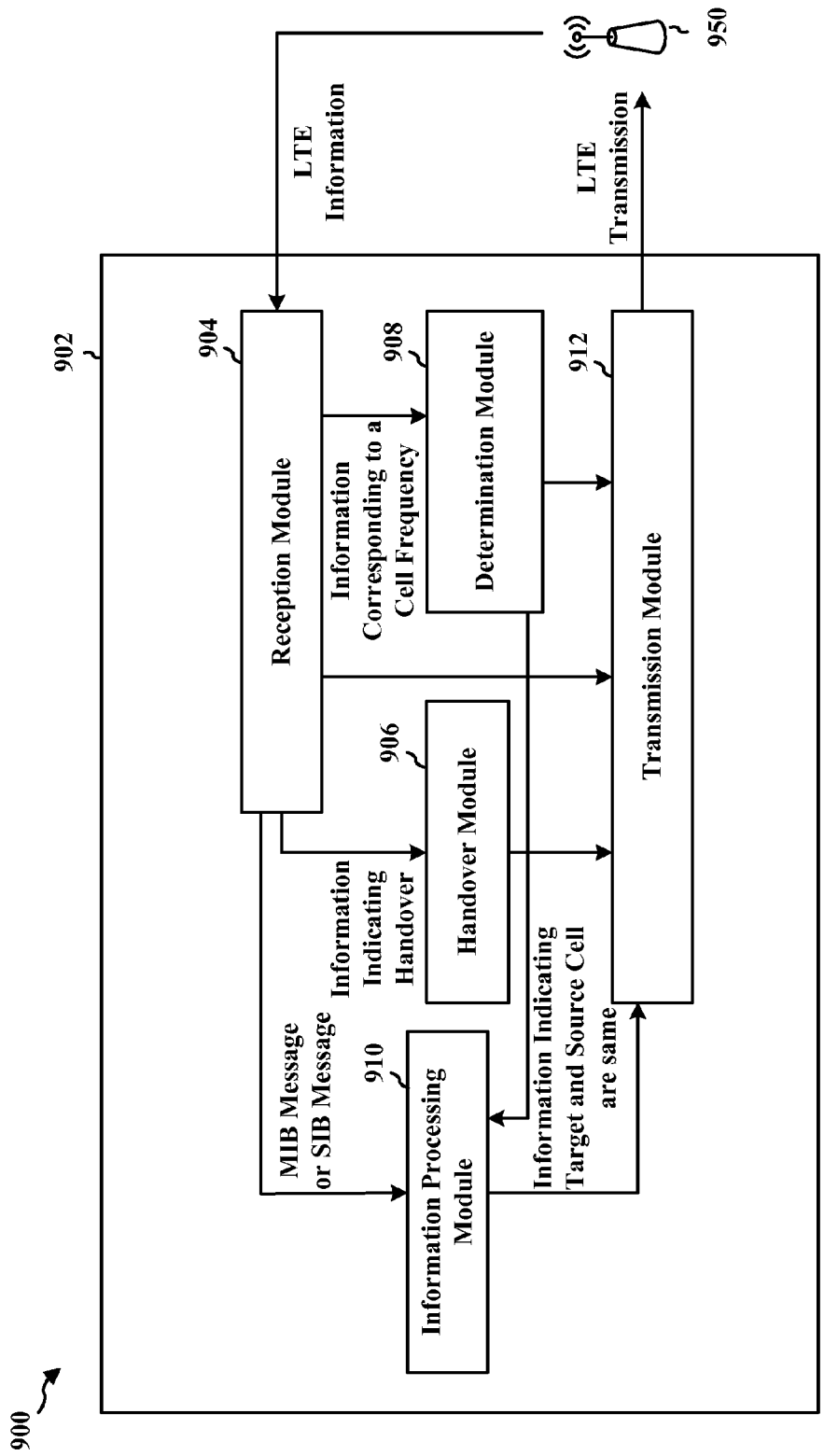
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a UE, such as the UE 703 experiencing a same cell handover 702a as described with respect to the first configuration, supra. The UE 902 includes a reception module 904 that is configured to receive LTE information from a base station (e.g., 950, eNB 705 of cell 709, or eNB 707 of cell 711). The UE 902 may further include a handover module 906 that is configured to perform, allow, or enable a handover from a source cell on a cell frequency to a target cell on the same frequency. For example, the handover module 906 may be configured to receive information from the reception module indicating that completion of a handover. The UE 902 may further include a determination module 908 that is configured to determine that the target cell is the same as the source cell. For example, the determination module 908 may be configured to receive information from the reception module 904 indicating a cell frequency, or a cell id, of the source cell and/or the target cell. The determination module 908 may be configured to determine that the source cell and the target cell have a same cell identifier. The determination module 908 may be configured to determine that a TTI-B flag is toggled. The UE 902 may further include an information processing module 910 that is configured to use information from a MIB message or a SIB message previously received from the source cell. For example, the information processing module 910 may be configured to receive information corresponding to a MIB and/or a SIB from the reception module 904, and may be configured to receive information indicating that the target cell and the source cell are the same from the determination module 908. If the determination module 908 indicates that the source cell and the target cell are the same, the information processing module may refrain from decoding the MIB or SIB. The UE 902 may further include a transmission module 912 that is configured to transmit an LTE transmission to a base station 950.

The apparatus may include additional modules that perform each of the blocks of the algorithm in the aforementioned flow chart of FIG. 8. As such, each block in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
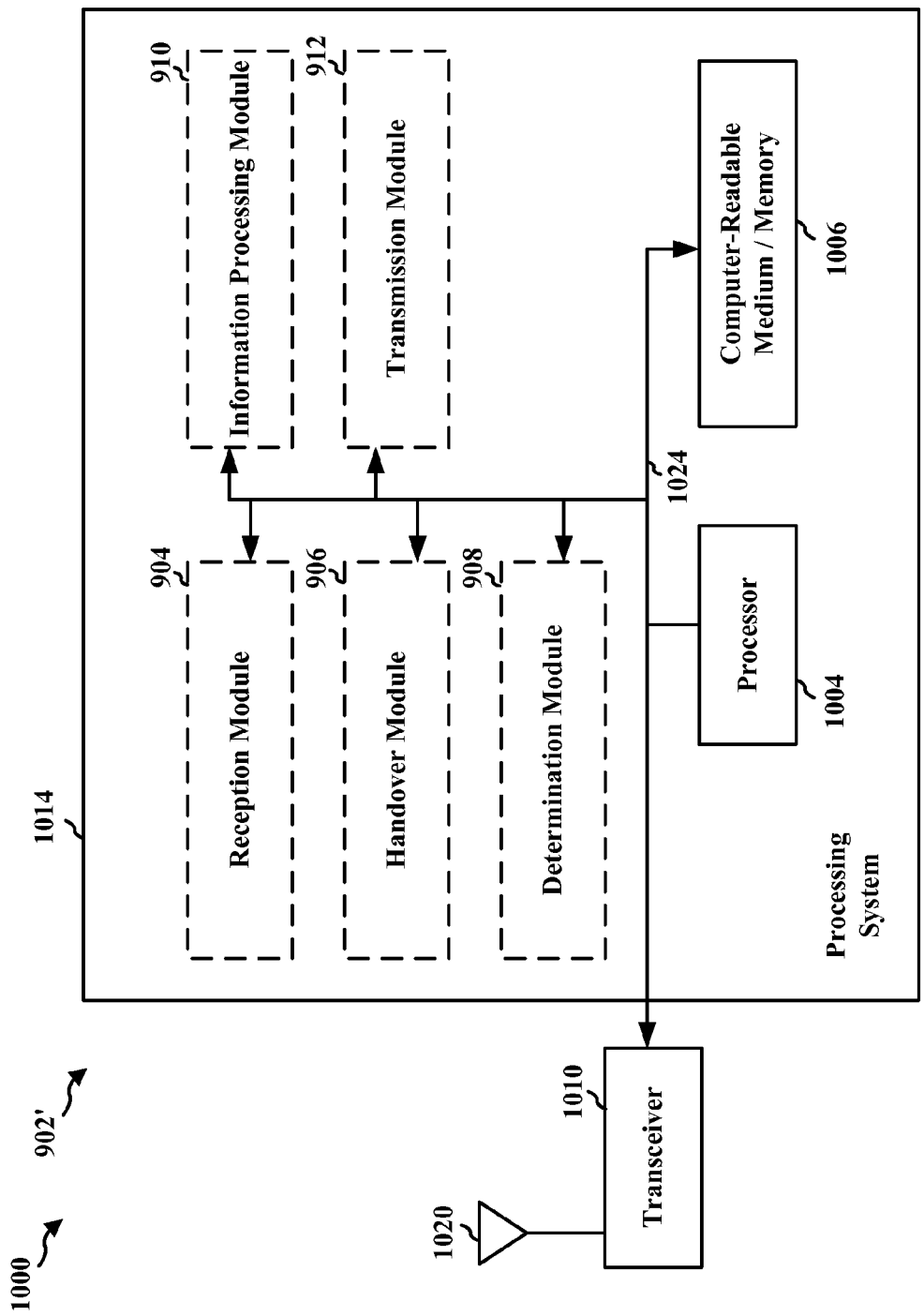
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception module 904. In addition, the transceiver 1010 receives information from the processing system 1014, specifically the transmission module 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 906, 908, 910. The modules may be software modules running in the processor 1004, resident/stored in the computer readable medium/memory 1006, one or more hardware modules coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 902/902' for wireless communication includes means for performing a handover from a source cell on a cell frequency to a target cell on the same frequency, means for determining that the target cell is the same as the source cell, and means for using information from a master information block (MIB) message or a system information block (SIB) message previously received from the source cell. The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 11:
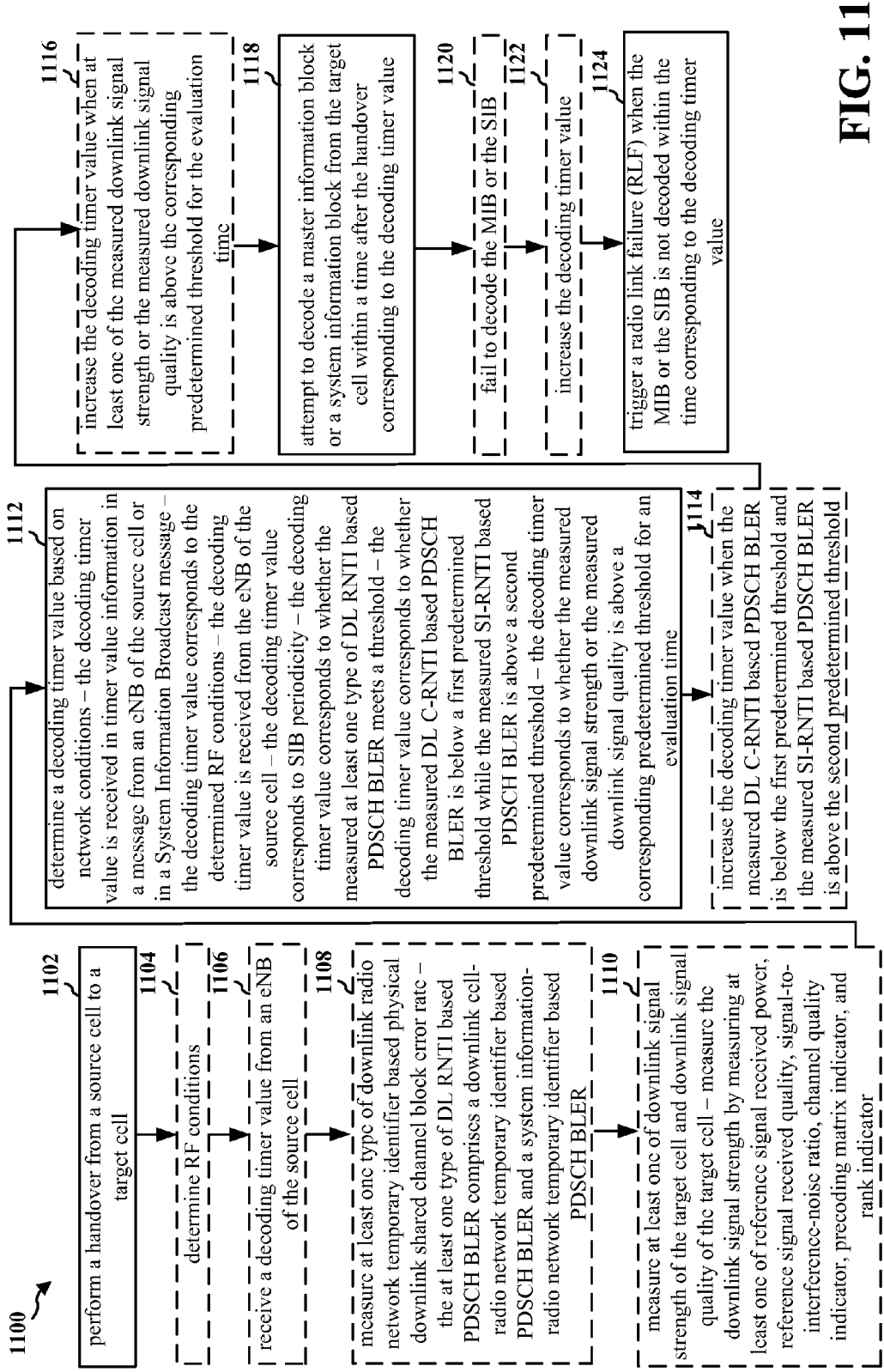
FIG. 11 is a flow chart of a method of wireless communication.

FIG. 11 is a flow chart 1100 of a method of wireless communication. The method may be performed by a UE (e.g., the UE 703 of the alternative configurations, which experiences a handover 702b from a source cell 709 to a different target cell 711, as described supra, or the apparatus 1202/1202', described infra). At 1102, the UE performs a handover from a source cell to a target cell. For example, referring to FIG. 7, the UE 703 may perform a handover 702b from a source cell 709 to a target cell 711 (e.g., the UE 703 is handed over 702b from the source cell 709 to the target cell 711, or the UE 703 is handed over within the same cell). At 1104, the UE may determine RF conditions. For example, referring to FIG. 7, the UE 703 may determine 704b RF conditions (e.g., RF conditions of the target cell 711).

At 1106, the UE may receive a decoding timer value from an eNB of the source cell. For example, referring to FIG. 7, the UE 703 may receive 706b a decoding timer value from an eNB 705 of the source cell 709 (it should be noted that the UE 703 may also receive 706b information from the source cell 709 to enable the UE 703 to determine the decoding timer value).

At 1108, the UE may measure at least one type of downlink radio network temporary identifier based physical downlink shared channel block error rate. The at least one type of DL RNTI based PDSCH BLER may include a downlink cell-radio network temporary identifier based PDSCH BLER and a system information-radio network temporary identifier based PDSCH BLER. For example, referring to FIG. 7, the UE 703 may measure 708 at least one type of DL RNTI based PDSCH BLER that includes a DL C-RNTI based PDSCH BLER and a SI-RNTI based PDSCH BLER.

At 1110, the UE may measure at least one of downlink signal strength of the target cell and downlink signal quality of the target cell. The UE may measure the downlink signal strength by measuring at least one of RSRP, RSRQ, SINR, CQI, PMI, and RI. For example, referring to FIG. 7, the UE 703 may measure 710a downlink signal strength of the target cell 711 by measuring at least one of RSRP, RSRQ, SINR, CQI, PMI, and RI, and/or may measure 710b downlink signal quality of the target cell 711.

At 1112, the UE determines a decoding timer value based on network conditions. The decoding timer value may be determined by receiving timer value information in a message from an eNB of the source cell or in a System Information Broadcast message. The decoding timer value may correspond to the determined RF conditions. The decoding timer value may be received from the eNB of the source cell. The decoding timer value may correspond to SIB periodicity. The decoding timer value may correspond to whether the measured at least one type of DL RNTI based PDSCH BLER meets a threshold. The decoding timer value may correspond to whether the measured DL C-RNTI based PDSCH BLER is below a first predetermined threshold while the measured SI-RNTI based PDSCH BLER is above a second predetermined threshold. The decoding timer value may correspond to whether the measured downlink signal strength or the measured downlink signal quality is above a corresponding predetermined threshold for an evaluation time. For example, referring to FIG. 7, the UE 703 may determine 712 a decoding timer value based on network conditions, which may correspond to the determined 704b RF conditions, may be received 706b from the eNB 705 of the source cell 709, may correspond to SIB periodicity, may correspond to whether the measured 708 at least one type of DL RNTI based PDSCH BLER meets a threshold, may correspond to whether the measured 708 DL C-RNTI based PDSCH BLER is below a first predetermined threshold while the measured SI-RNTI based PDSCH BLER is above a second predetermined threshold, and/or may correspond to whether the measured 710a downlink signal strength or the measured 710b downlink signal quality is above a corresponding predetermined threshold for an evaluation time.

At 1114, the UE may increase the decoding timer value when the measured DL C-RNTI based PDSCH BLER is below the first predetermined threshold and the measured SI-RNTI based PDSCH BLER is above the second predetermined threshold. For example, referring to FIG. 7, the UE 703 may increase 714 the decoding timer value when the measured DL C-RNTI based PDSCH BLER is below the first predetermined threshold and the measured SI-RNTI based PDSCH BLER is above the second predetermined threshold. At 1116, the UE may increase the decoding timer value when at least one of the measured downlink signal strength or the measured downlink signal quality is above the corresponding predetermined threshold for the evaluation time. For example, referring to FIG. 7, the UE 703 may increase 714 the decoding timer value when at least one of the measured 710a downlink signal strength or the measured 710b downlink signal quality is above the corresponding predetermined threshold for the evaluation time.

At 1118, the UE attempts to decode a MIB or a SIB from the target cell within a time after the handover corresponding to the decoding timer value. For example, referring to FIG. 7, the UE 703 may attempt to decode 718a a MIB or a SIB received 718b from the target cell 711 within a time after the handover 702b corresponding to the decoding timer value. At 1120, the UE may fail to decode the MIB or the SIB. For example, referring to FIG. 7, the UE 703 may fail to decode 718a the MIB or the SIB. At 1122, the UE may increase the decoding timer value. For example, referring to FIG. 7, the UE 703 may increase 714 the decoding timer value (e.g., upon failing to decode 718a the MIB or the SIB).

At 1124, the UE triggers a RLF when the MIB or the SIB is not decoded within the time corresponding to the decoding timer value. For example, referring to FIG. 7, the UE 703 may trigger 724 a RLF when the MIB or the SIB is not decoded 718a within the time corresponding to the decoding timer value.

Figure 12:
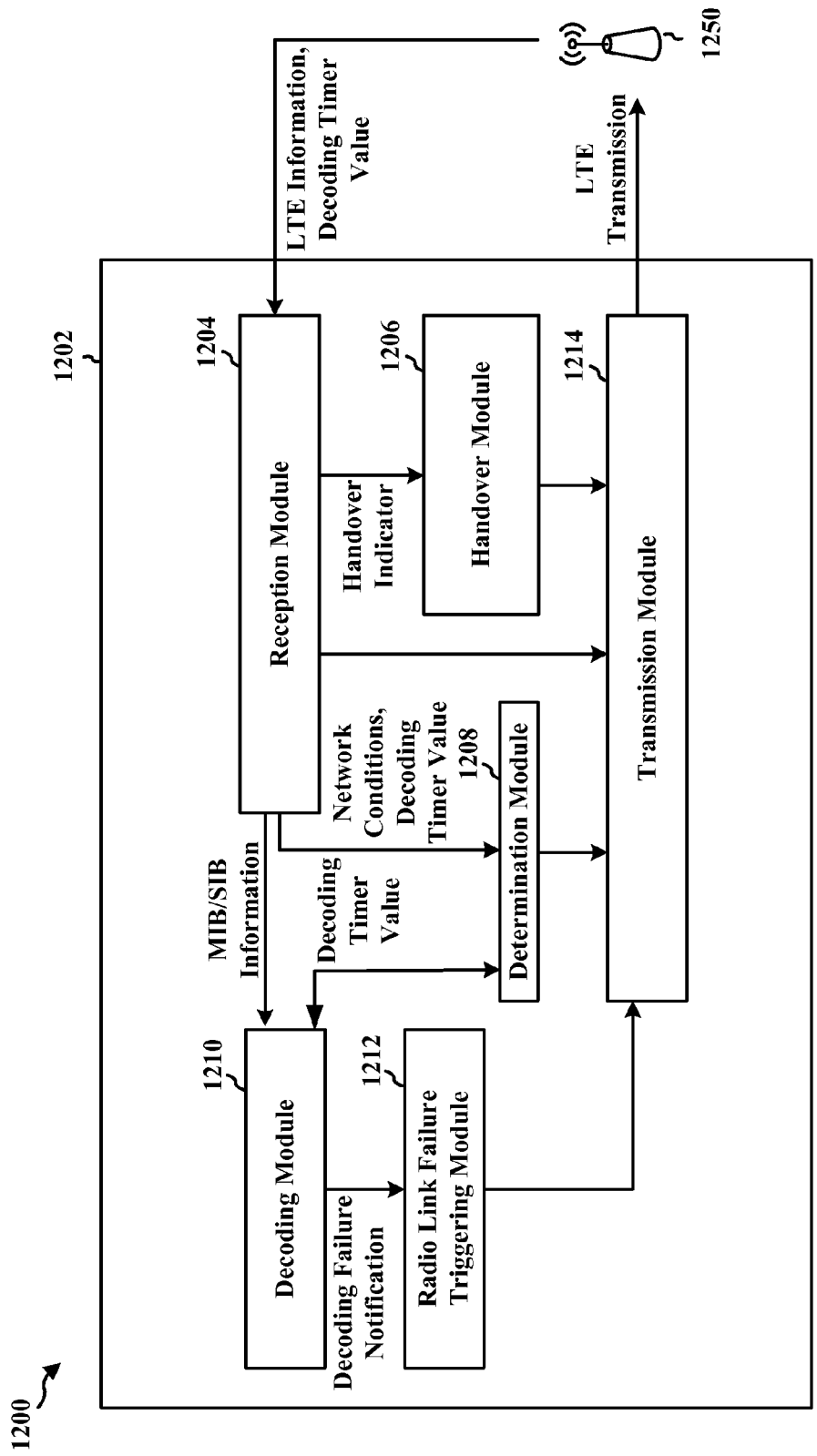
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus may include a reception module 1204 that is configured to receive LTE information. The LTE information may include, for example, an LTE communication from another UE or from a base station (e.g., eNB 1250, 705, or 707). The LTE information may include network conditions. The network conditions may correspond to, for example, RF conditions, SIB periodicity, DL RNTI based PDSCH BLER, downlink signal strength, downlink signal quality of the target cell, and/or information corresponding to a decoding timer value. The reception module 1204 may further be configured to receive a decoding timer value from an eNB 1250 of a source cell (e.g., a decoding timer value in an LTE communication from the eNB 1250).

The apparatus may further include a handover module 1206 that is configured to perform, allow, and/or enable a handover from a source cell to a target cell. The handover module 1206 may be configured to receive information from the reception module 1204 indicating that a handover has occurred or will occur (e.g., cell frequency information, Cell ID information, or network/cell conditions).

The apparatus may further include a determination module 1208 that is configured to receive information from the reception module 1204 (e.g., network conditions, or information corresponding to a decoding timer value), and is configured to determine a decoding timer value based on network conditions. The determination module 1208 may further be configured to determine RF conditions. The decoding timer value may correspond to the determined RF conditions. The decoding timer value may correspond to SIB periodicity. The determination module 1208 may further be configured to measure at least one type of DL RNTI based PDSCH BLER. The decoding timer value may correspond to whether the measured at least one type of DL RNTI based PDSCH BLER meets a threshold. The at least one type of DL RNTI based PDSCH BLER may include a DL C-RNTI based PDSCH BLER and a SI-RNTI based PDSCH BLER. The decoding timer value may correspond to whether the measured DL C-RNTI based PDSCH BLER is below a first predetermined threshold while the measured SI-RNTI based PDSCH BLER is above a second predetermined threshold. The determination module 1208 may further be configured to increase the decoding timer value when the measured DL C-RNTI based PDSCH BLER is below the first predetermined threshold and the measured SI-RNTI based PDSCH BLER is above the second predetermined threshold. The determination module 1208 may further be configured to measure at least one of downlink signal strength of the target cell and downlink signal quality of the target cell. The decoding timer value may correspond to whether the measured downlink signal strength or the measured downlink signal quality is above a corresponding predetermined threshold for an evaluation time. The determination module 1208 may be configured to measure the downlink signal quality by measuring at least one of RSRP, RSRQ, SINR, CQI, PMI, and RI. The determination module 1208 may further be configured to increase the decoding timer value when at least one of the measured downlink signal strength or the measured downlink signal quality is above the corresponding predetermined threshold for the evaluation time.

The apparatus may further include a decoding module 1210 that is configured to attempt to decode a MIB or a SIB from the target cell within a time after the handover corresponding to the decoding timer value. The decoding module 1210 may be configured to receive information from the reception module 1204, such as a MIB message or a SIB message. The decoding module 1210 may fail to decode the MIB or the SIB, and the determination module 1208 may further be configured to increase the decoding timer value when the decoding module 1210 fails to decode the MIB or the SIB. The decoding module 1210 may be configured to receive information regarding the decoding timer value from the determination module 1208 (e.g., so that the decoding module 1210 knows how much time to allow to pass before determining that the decoding module 1210 has failed to decode the MIB or the SIB within the time corresponding to the decoding timer value). The decoding module 1210 may be configured to provide information to the determination module 1208 (e.g., to indicate when the decoding module 1210 fails to decode the MIB or the SIB within the decoding timer value, thereby allowing the determination module 1208 to determine whether to increase the decoding timer value).

The apparatus may further include a radio link failure-triggering module 1212 configured to receive information from the decoding module 1210 (e.g., a decoding failure notification), and configured to trigger an RLF when the MIB or the SIB is not decoded within the time corresponding to the decoding timer value (e.g., upon receiving a notification from the decoding module 1210 that the decoding module 1210 has failed to timely decode the MIB or the SIB).

The apparatus may include additional modules that perform each of the blocks of the algorithm in the aforementioned flow charts of FIG. 12. As such, each block in the aforementioned flow charts of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof. The UE 902 may further include a transmission module 1214 that is configured to transmit an LTE transmission to a base station (e.g., eNB 1250, eNB 705, eNB 707).

Figure 13:
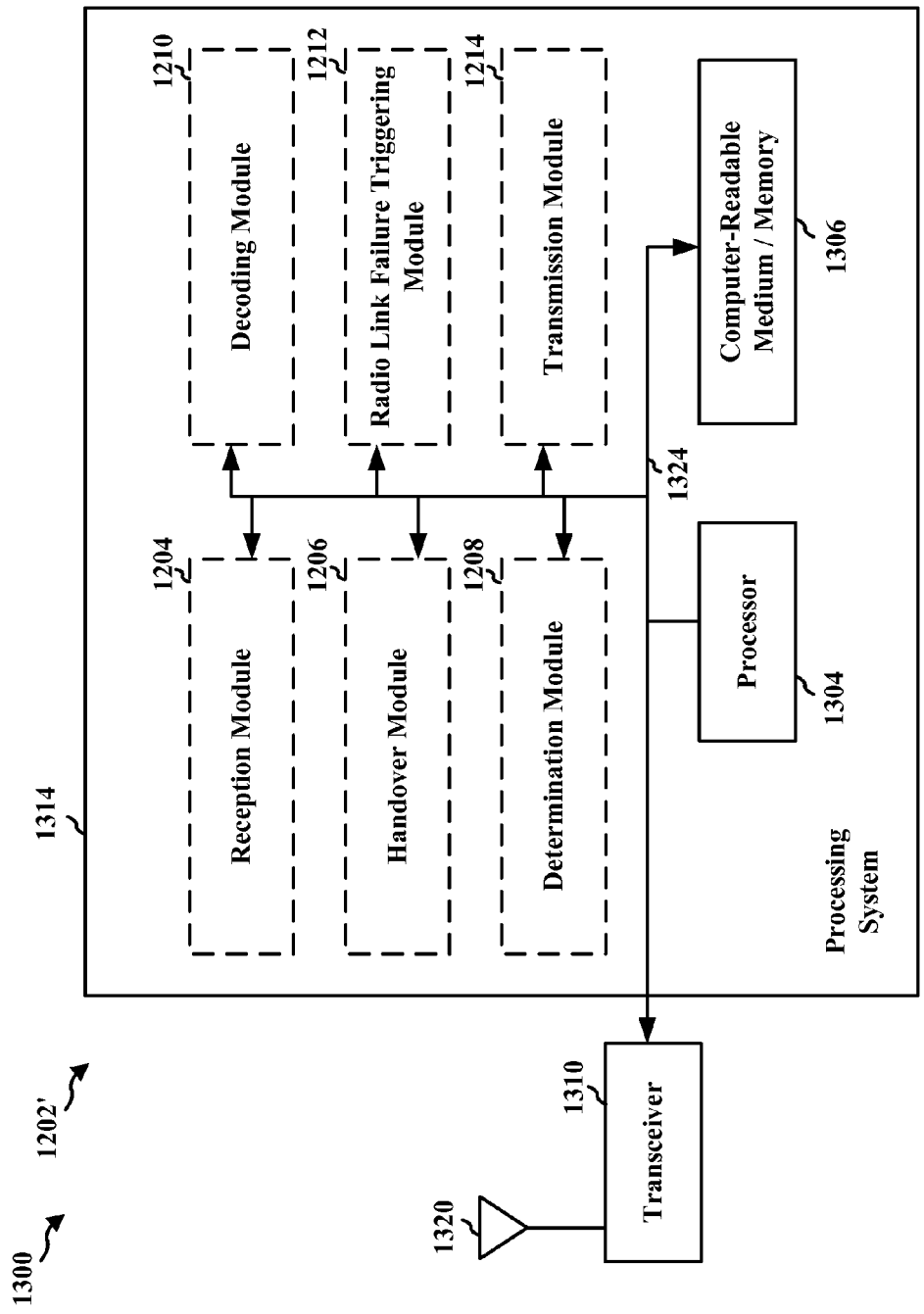
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception module 1204. In addition, the transceiver 1310 receives information from the processing system 1314, specifically the transmission module 1214, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, 1212, 1214. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for performing a handover from a source cell to a target cell, means for determining a decoding timer value based on network conditions, means for attempting to decode a MIB or a SIB from the target cell within a time after the handover corresponding to the decoding timer value, means for triggering a RLF when the MIB or the SIB is not decoded within the time corresponding to the decoding timer value, means for determining RF conditions, means for receiving the decoding timer value from an eNB of the source cell, means for increasing the decoding timer value, means for measuring at least one type of DL RNTI based PDSCH BLER, and means for measuring at least one of downlink signal strength of the target cell and downlink signal quality of the target cell. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, by a user equipment, comprising:
    performing a handover from a source cell to a target cell;
    determining that the target cell and the source cell are a same cell when the source cell and the target cell have a same cell frequency;
    determining that Transmission Time Interval-Bundling (TTI-B) is enabled; and
    refraining from decoding a master information block (MIB) message or a system information block message (SIB) of the target cell when it is determined that the target cell and the source cell are the same cell and that TTI-B is enabled.

2. The method of claim 1, further comprising maintaining a voice over long term evolution call (VoLTE) using the MIB or SIB of the source cell after the handover to the target cell is performed.

3. The method of claim 1, further comprising determining that the source cell and the target cell have a same cell identifier.

4. The method of claim 1, wherein the determining that TTI-B is enabled comprises determining that a TTI-B flag is toggled.

5. An apparatus for wireless communication, comprising:
    means for performing a handover from a source cell to a target cell;
    means for determining that the target cell and the source cell are a same cell when the source cell and the target cell have a same cell frequency;
    means for determining that Transmission Time Interval-Bundling (TTI-B) is enabled; and
    means for refraining from decoding a master information block (MIB) message or a system information block message (SIB) of the target cell when it is determined that the target cell and the source cell are the same cell and that TTI-B is enabled.

6. The apparatus of claim 5, further comprising means for maintaining a voice over long term evolution call (VoLTE) using the MIB or SIB of the source cell after the handover to the target cell is performed.

7. The apparatus of claim 5, further comprising means for determining that the source cell and the target cell have a same cell identifier.

8. The apparatus of claim 5, wherein the means for determining that TTI-B is enabled is configured to determine that a TTI-B flag is toggled.

* * * * *